United States Patent
Wang et al.

(10) Patent No.: US 11,880,516 B2
(45) Date of Patent: Jan. 23, 2024

(54) ROLLING MECHANISM AND MOUSE DEVICE USING THE SAME

(71) Applicants: Silitek Electronics (Dongguan) Co., Ltd, Guangdong (CN); LITE-ON TECHNOLOGY CORPORATION, Taipei (TW)

(72) Inventors: Jun Wang, Guangdong (CN); Chiung-Chih Huang, Taipei (TW)

(73) Assignees: Silitek Electronics (Dongguan) CO., LTD., Guangdong (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/152,545

(22) Filed: Jan. 19, 2021

(65) Prior Publication Data

US 2021/0294437 A1 Sep. 23, 2021

(30) Foreign Application Priority Data

Mar. 19, 2020 (CN) .......................... 202010197838.X (51) Int. Cl.
G06F 3/0362 (2013.01)
G06F 3/0354 (2013.01)

(52) U.S. Cl.
CPC ........ *G06F 3/0362* (2013.01); *G06F 3/03543* (2013.01)

(58) Field of Classification Search
CPC .. G06F 3/0312; G06F 3/0362; G06F 3/03543; G06F 3/03541
See application file for complete search history.

(56) References Cited

U.S. PATENT DOCUMENTS

| | | | |
|---|---|---|---|
| 6,137,477 A * | 10/2000 | Hu | G06F 3/03543 345/169 |
| 2003/0151594 A1* | 8/2003 | Tsai | H01H 25/008 345/163 |

FOREIGN PATENT DOCUMENTS

CN 200965674 Y 10/2007

OTHER PUBLICATIONS

Chinese Office Action corresponding to Application No. 202010197838.X dated Mar. 1, 2023, 8 pages.

* cited by examiner

Primary Examiner — Hang Lin
(74) Attorney, Agent, or Firm — Innovation Counsel LLP (57) ABSTRACT

The present invention discloses a rolling mechanism and a mouse device using the same. The rolling mechanism comprises a base, a circuit module, a roller module, an encoding element and an elastic element. The circuit module is disposed on the base. The roller module is disposed on the circuit module and movable on the base. The encoding element is disposed on the circuit module and electrically connected with the circuit module, and further connected to the roller module. The elastic element is disposed between the roller module and the encoding element, and the elastic element is propped against the roller module. The mouse device comprises a mouse body and a rolling mechanism disposed in the mouse body.

15 Claims, 5 Drawing Sheets

ROLLING MECHANISM AND MOUSE DEVICE USING THE SAME

This application claims the benefit of People's Republic of China application serial no. 202010197838.X, filed on Mar. 19, 2020, the subject matter of which is incorporated herein by reference.

BACKGROUND OF THE INVENTION

Field of the Invention

The invention relates to a rolling mechanism and a mouse device using the same, and more particularly relates to a rolling mechanism with an elastic element and a mouse device using the same.

Description of the Related Art

In terms of the current mouse, when a user presses or rolls a roller of a mouse, noise may easily be generated due to the fit clearance between an encoding element of the mouse and a supporting element of the roller. Furthermore, the roller of the mouse also may be easily shaken and cannot maintain at a middle position of the mouse. Therefore, it has become a prominent task for industries to provide a new rolling mechanism and a mouse device using the same in order to solve the noise problem and the roller positioning problem when using the mouse.

SUMMARY OF THE INVENTION

The invention is directed to a rolling mechanism and a mouse device using the same which can solve the existing problem about the currently available mouse and enhance user's experience.

According to a first aspect of the present invention, a rolling mechanism is provided. The rolling mechanism comprises a base, a circuit module, a roller module, an encoding element and an elastic element. The circuit module is disposed on the base. The roller module is disposed on the circuit module and is movable on the base. The encoding element is disposed on the circuit module and electrically connected with the circuit module, and further connected to the roller module. The elastic element is disposed between the roller module and the encoding element, and the elastic element is propped against the roller module.

According to a second aspect of the present invention, a mouse device is provided. The mouse device comprises a mouse body and a rolling mechanism according to the first aspect of the present invention. The rolling mechanism is disposed in the mouse body.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1A:
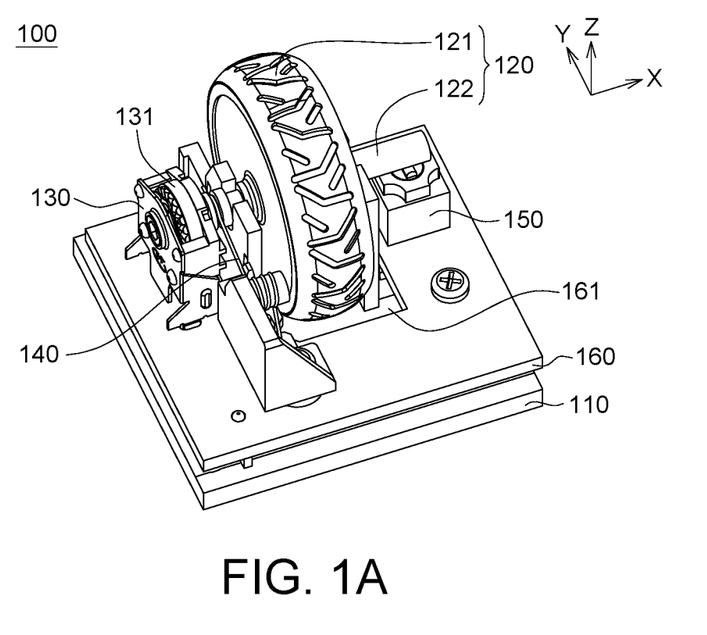
FIG. 1A is a schematic diagram of a rolling mechanism according to a first embodiment of the present invention.
Figure 1B:
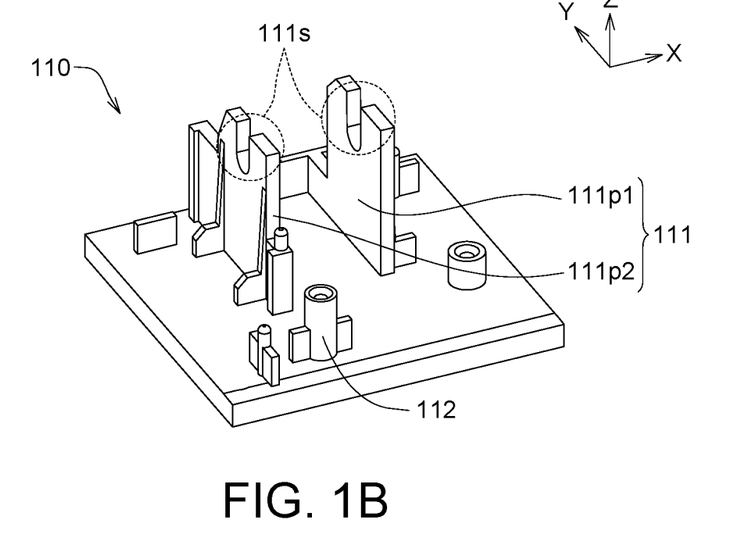
FIG. 1B is a schematic diagram of parts of the rolling mechanism according to the first embodiment of the present invention.
Figure 1C:
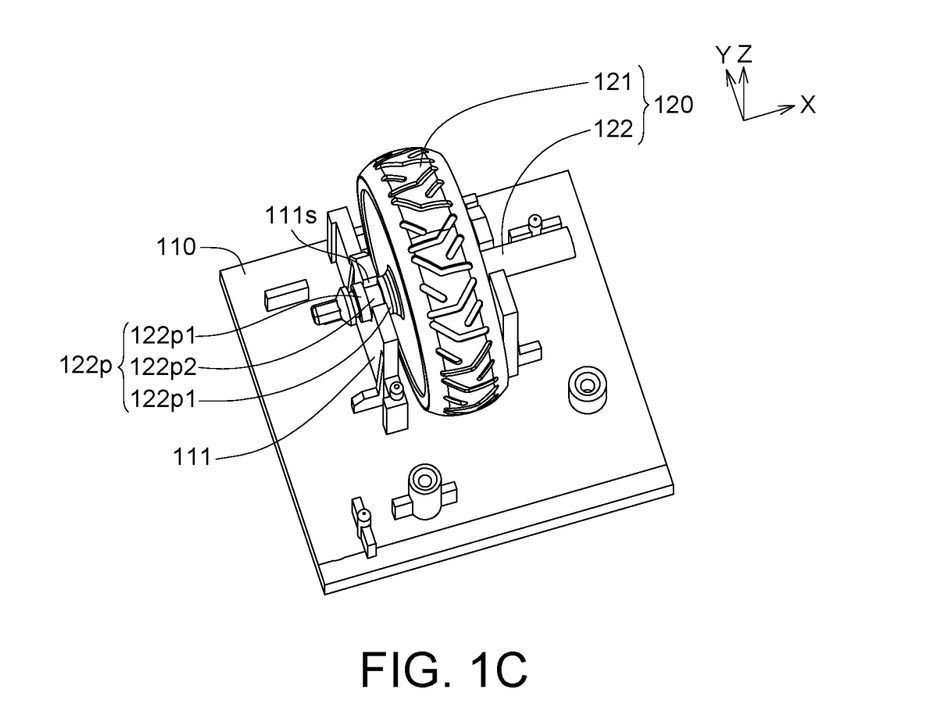
FIG. 1C is an assembly diagram of some parts of the rolling mechanism according to the first embodiment of the present invention.
Figure 1D:
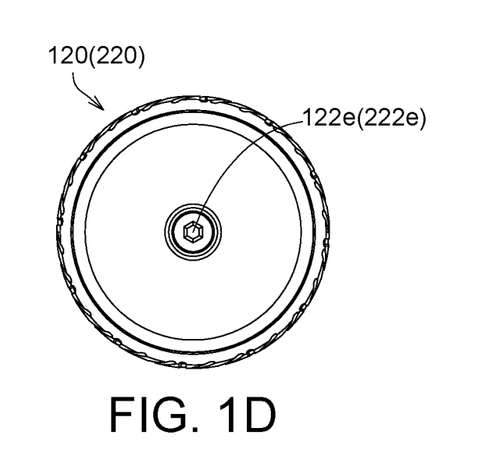
FIG. 1D is a side view of parts of the rolling mechanism according to the first embodiment of the present invention.
Figure 1E:
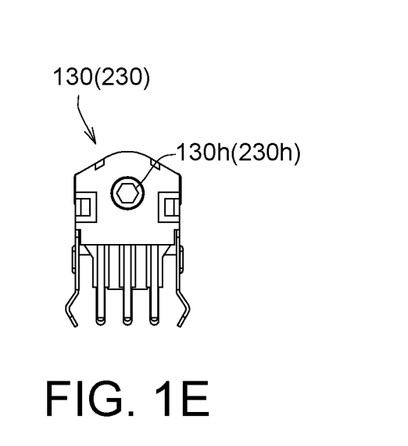
FIG. 1E is a side view of parts of the rolling mechanism according to the first embodiment of the present invention.
Figure 1F:
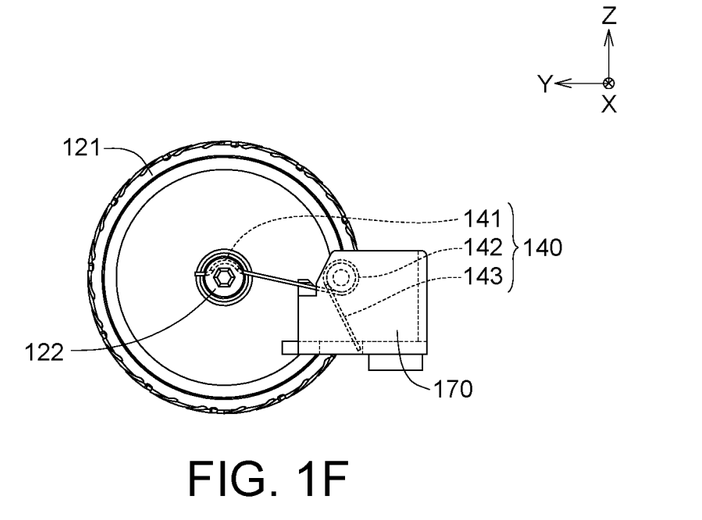
FIG. 1F is a side perspective of an assembly of some parts of the rolling mechanism according to the first embodiment of the present invention.
Figure 1G:
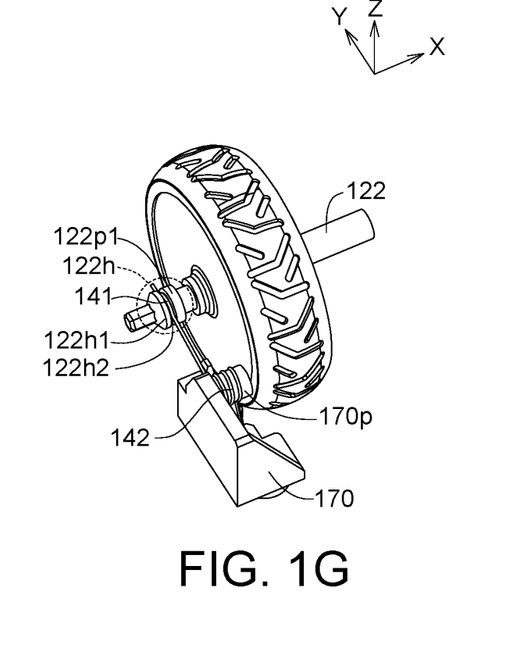
FIG. 1G is an assembly diagram of some parts of the rolling mechanism according to the first embodiment of the present invention.
Figure 1H:
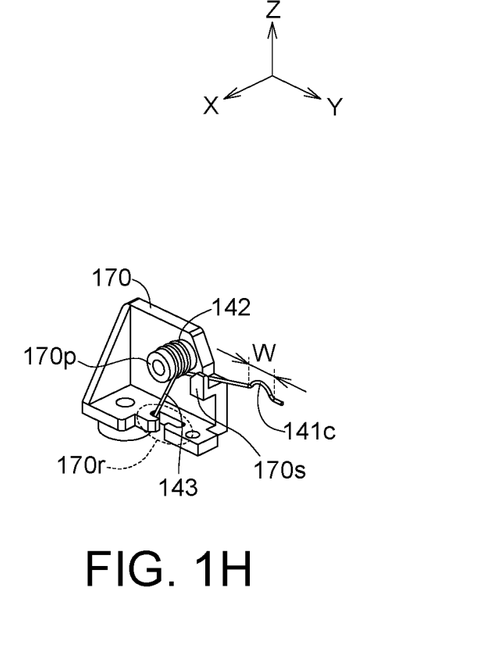
FIG. 1H is an assembly diagram of some parts of the rolling mechanism according to the first embodiment of the present invention.

Refer to FIG. 1A to FIG. 1H. FIG. 1A is a schematic diagram of a rolling mechanism 100 according to a first embodiment of the present invention. FIG. 1B is a schematic diagram of a base 110 of the rolling mechanism 100 according to the first embodiment of the present invention. FIG. 10 is an assembly diagram of a roller module 120 and the base 110 of the rolling mechanism 100 according to the first embodiment of the present invention. FIG. 1D is a side view of the roller module 120 of the rolling mechanism 100 according to the first embodiment of the present invention. FIG. 1E is a side view of an encoding element 130 of the rolling mechanism 100 according to the first embodiment of the present invention. FIG. 1F is a side perspective of an assembly of the roller module 120 and an elastic element 140 of the rolling mechanism 100 according to the first embodiment of the present invention. FIG. 1G is an assembly diagram of the roller module 120 and the elastic element 140 of the rolling mechanism 100 according to the first embodiment of the present invention. FIG. 1H is an assembly diagram of the base 110 and the elastic element 140 of the rolling mechanism 100 according to the first embodiment of the present invention.

Refer to FIG. 1A, the rolling mechanism 100 comprises a base 110, a circuit module 160, a roller module 120, an encoding element 130 and an elastic element 140. The circuit module 160 is disposed on the base 110. The roller module 120 is disposed on the circuit module 160 and movable on the base 110. The encoding element 130 is disposed on the circuit module 160 and electrically connected with the circuit module 160, and the encoding element 130 is connected to the roller module 120. The elastic element 140 is disposed between the roller module 120 and the encoding element 130, and the elastic element 140 is propped against the roller module 120.

Refer to FIG. 1B, the base 110 includes a limiting element 111 protruded on the surface of the base 110. A limiting space 111s with a notched shape is formed at an upper end portion of the limiting element 111. In the present embodiment, the limiting element 111 has a pair of protruding structures 111p1, 111p2 which are integrally formed on the base 110, and each protruding structure has said limiting space 111s. However, the present invention is not limited thereto, and the limiting element 111 may be a structure detachable from the base 110. For example, the limiting element 111 and the base 110 may be connected by screws and need not be integrally formed.

Refer to FIG. 1C, the roller module 120 is disposed on the base 110 and includes a roller 121 and a shaft 122. The shaft 122 has a positioning structure 122p, the shaft 122 passes through and is connected to the roller 121. The positioning structure 122p is pivotally disposed on the limiting space 111s of the limiting element 111, such that the limiting element 111 can support the roller module 120 and allows the roller module 120 to rotate along an axial direction of the shaft 122 or to reciprocate in a direction (such as the Z direction shown in the figures) perpendicular to the surface of the base 110. In an embodiment, the positioning structure 122p is a dumbbell-shaped structure with two radial protruding portions 122p1 and one middle recessed portion 122p2. The limiting element 111 is pivotally connected to the middle recessed portion 122p2 and limited by the two protruding portions 122p1, such that the roller module 120 may be positioned relative to the base 110 along a radial direction (such as the X direction shown in the figures).

Refer to FIG. 1A, the encoding element 130, which may be a rotary encoder, is disposed on the circuit module 160 and connected to the roller module 120. The shaft 122 is connected to the encoding element 130, and the encoding element 130 has a rotor 131 driven by the roller module 120. Refer to FIG. 1D and FIG. 1E, regarding the connection between the encoding element 130 and the roller module 120, the end portion 122e of the shaft 122 adjacent to the encoding element 130 may be designed as a hexagonal shaft, and the center hole 130h of the rotor 131 of the encoding element 130 may be designed as a hexagonal hole, such that the shaft 122 can be engaged with the encoding element 130 via the shaft-hole fit between the end portion 122e and the center hole 130h. However, the present invention is not limited thereto. In other embodiments, the shaft 122 and the center hole of the rotor 131 may have other shapes, and any shape would do as long as the encoding element 130 can be driven by the roller module 120. In an embodiment, the roller module 120 and the encoding element 130 may be connected by using a transition fit.

Refer to FIG. 1A and FIG. 1F, the elastic element 140 may be a torsion spring whose coefficient of elasticity (torsion) is designed to be in a range of 50 to 80 gram force (gf). Exemplarily but not restrictively, the elastic element 140 is formed of a metal spring. The elastic element 140 is disposed between the roller module 120 and the encoding element 130, and the elastic element 140 is propped against the roller module 120. The elastic element 140 has a first end portion 141, a middle portion 142 and a second end portion 143, wherein the first end portion 141 is propped against the shaft 122.

Refer to FIG. 1G, the shaft 122 has a limiting structure 122h, one end of the limiting structure 122h adjacent to the roller 121 is the radial protruding portion 122p1 of the positioning structure 122p, and the other end of the limiting structure 122h adjacent to the encoding element 130 forms a radial protruding portion 122h1. An annular space 122h2 is formed between the radial protruding portion 122p1 and the radial protruding portion 122h1, and the first end portion 141 is received in the annular space 122h2. That is, the limiting structure 122h and the positioning structure 122p can share the same radial protruding portion 122p1. However, the present invention is not limited thereto. In another embodiment, the limiting structure 122h need not share the same radial protruding portion with the positioning structure 122p, and two ends of the limiting structure 122h respectively form a radial protruding portion 122h1.

Refer to FIG. 1A, FIG. 1F, FIG. 1G and FIG. 1H, the first end portion 141 of the elastic element 140 has an arced structure 141c, the first end portion 141 is engaged with the limiting structure 122h through the arced structure 141c, and the contour of the arced structure 141c matches an outer surface of the shaft 122. In an embodiment, the arced structure 141c has a width w in a radial direction of the shaft 122. The width w may be designed to be greater than a diameter of the shaft 122 so as to prevent over-constraint between the roller module 120 and the elastic element 140, thereby assuring that the roller module 120 can be operated smoothly.

Refer to FIG. 1A, FIG. 1G and FIG. 1H, the rolling mechanism 100 further comprises a fixed element 170 disposed on the base 110. The fixed element 170 has a column structure 170p and a groove 170r. As indicated in FIG. 1A and FIG. 1H, the fixed element 170 can provided with a through hole position, the base 110 can have a protruded screw hole member 112 passing through the circuit module 260 and the through hole position, and a screw member is fastened to the screw hole member 112 to fix the fixed element 170 on the base 110. In another embodiment, the fixed element 170 may be directly disposed on the circuit module 260. For example, a screw hole member passing through the through hole position of the fixed element 170 is formed on the circuit module 160, and this screw hole member is fastened to the through hole position to fix the fixed element 170 on the circuit module 160. The middle portion 142 of the elastic element 140 is connected to the fixed element 170. Specifically, the middle portion 142 is mounted on a column structure 170p whose extending direction is parallel to the axial direction of the shaft 122. The second end portion 143 is propped against an inner side of the groove 170r, such that a portion of the second end portion 143 of the elastic element 140 forms a fixing end of the torsion spring. Furthermore, the fixed element 170 can have a limiting part 170s disposed adjacent to a lateral side of the first end portion 141 to limit a range of travel of the first end portion 141.

The operation principles of the elastic element 140 of the first embodiment are described below with FIG. 1A and FIG. 1G. When a user presses the roller module 120, the roller 121 and the shaft 122 are pressed to move downwards; meanwhile, the first end portion 141 of the elastic element 140 correspondingly moves downwards. Since the elastic element 140 is an integrally formed torsion spring, when the first end portion 141 moves downwards, the second end portion 143 presses and squeezes the groove 123 of the fixed element 123, such that the groove 123 applies a counterforce to the second end portion 143 and makes the surrounding middle portion 142 accumulate an elastic potential for recovery. When the user releases the roller module 120, the shaft 122 moves upwards to its original position and drives the first end portion 141 upwards through the limiting structure 122h. Meanwhile, the elastic potential for recovery accumulated by the middle portion 142 is transferred to the first end portion 141 and generates a downward pressure, thereby reducing the shaking of the roller module 120 during recovery and reducing the noise generated when the shaft 122 fits with the encoding element 130.

The switch element 150, which may be a micro switch, is configured for trigger of a roller of mouse. Refer to FIG. 1A, the switch element 150 is disposed on the circuit module 160, and the switch element 150 and the encoding element 130 are respectively located on two opposite sides of the roller module 120. When a user presses or releases the roller 121, the shaft 122 is allowed to vertically reciprocate to contact the switch element 150 and trigger a clicking function. However, the present invention and is not limited thereto. In another embodiment, the switch element 150 and the encoding element 130 may be located on the same side of the roller module 120 as long as the roller module 120 can contact the switch element 150 when reciprocating.

The circuit module 160, which may be a printed circuit board assembly (PCBA), includes a circuit module and an electronic element electrically connected therewith, wherein examples of the electrical element includes IC circuit, storage element, light-emitting element and antennal element applied in the mouse. Refer to FIG. 1A, the circuit module 160 is disposed on the base 110 and has a recess 161, and the recess 161 allows the limiting element 111 to pass through. The circuit module 160 may be used to carry and be electrically connected with the encoding element 130 and the switch element 150.

Second Embodiment

Figure 2A:
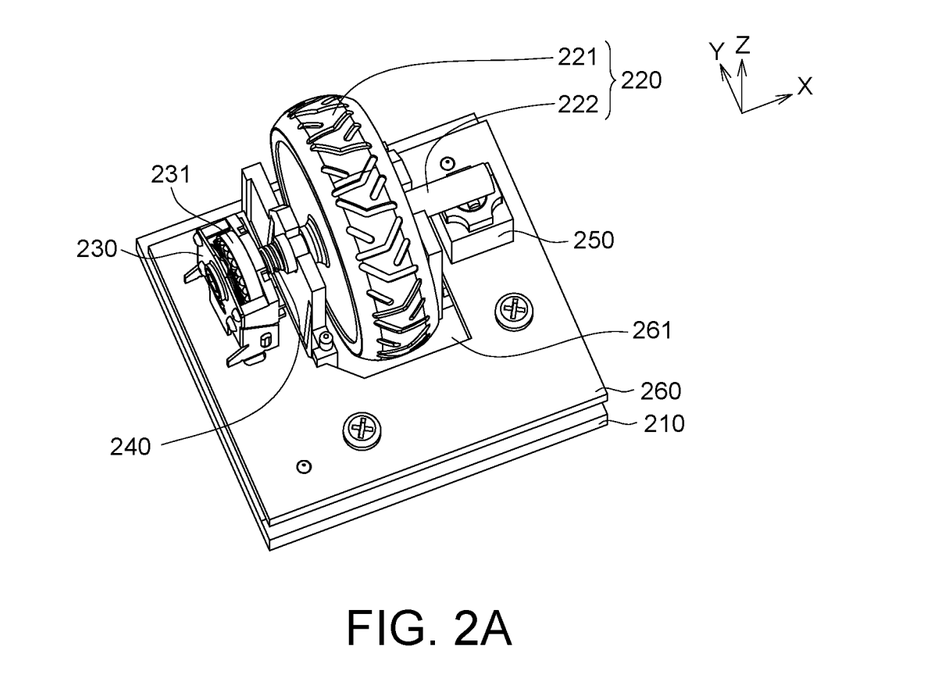
FIG. 2A is a schematic diagram of a rolling mechanism according to a second embodiment of the present invention.
Figure 2B:
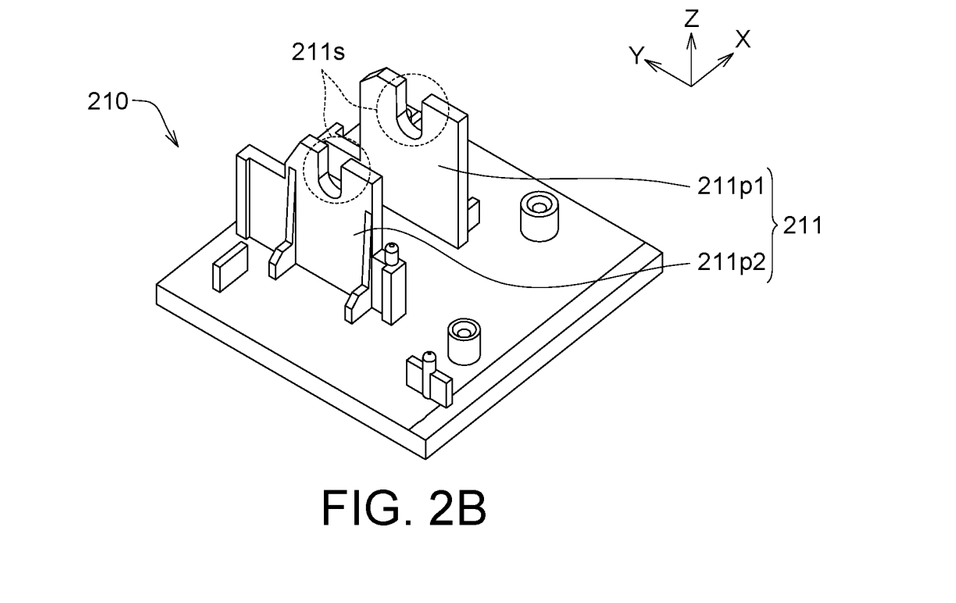
FIG. 2B is a schematic diagram of parts of the rolling mechanism according to the second embodiment of the present invention.
Figure 2C:
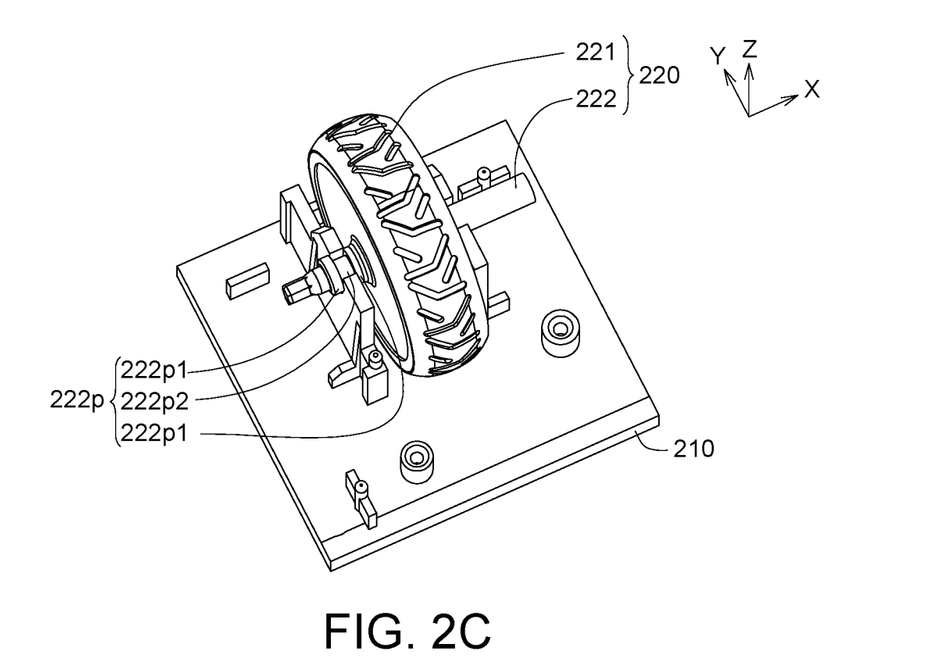
FIG. 2C is an assembly diagram of some parts of the rolling mechanism according to the second embodiment of the present invention.
Figure 2D:
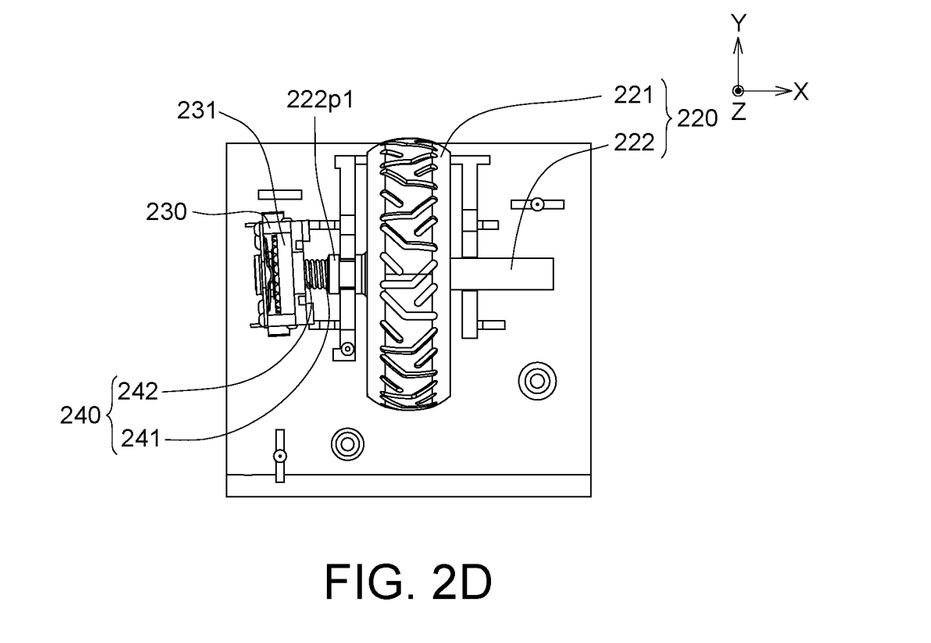
FIG. 2D is a top view of an assembly of some parts of the rolling mechanism according to the second embodiment of the present invention.

Refer to FIG. 2A to FIG. 2D. FIG. 2A is a schematic diagram of a rolling mechanism 200 according to a second embodiment of the present invention. FIG. 2B is a schematic diagram of a base 210 of the rolling mechanism 200 according to the second embodiment of the present invention. FIG. 2C is an assembly diagram of the base 210 and a roller module 220 of the rolling mechanism 200 according to the second embodiment of the present invention. FIG. 2D is a top view of an assembly of the roller module 220, the encoding element 230 and an elastic element 240 of the rolling mechanism 200 according to the second embodiment of the present invention.

Refer to FIG. 2A, the rolling mechanism 200 comprises a base 210, a circuit module 260, a roller module 220, an encoding element 230 and an elastic element 240. The circuit module 260 is disposed on the base 210. The roller module 220 is located on the circuit module 260 and movable on the base 210. The encoding element 230 is disposed on the circuit module 260 and electrically connected with the circuit module 260, and the encoding element 230 is connected to the roller module 220. The elastic element 240 is disposed between the roller module 220 and the encoding element 230, and the elastic element 240 is propped against the roller module 220.

Refer to FIG. 2B, the base 110 includes a limiting element 211 protruded on the surface of the base 210. A limiting space 211s with a notched shape is formed at an upper end portion of the limiting element 211. In the present embodiment, the limiting element 211 has a pair of protruding structures 211p1, 211p2 which are integrally formed on the base 210, and each protruding structure has a limiting space 211s. However, the present invention is not limited thereto, and the limiting element 211 may be a structure detachable from the base 210. For example, the limiting element 211 and the base 210 may be connected by screws and need not be integrally formed.

Refer to FIG. 2C, the roller module 220 is disposed on the base 210 and includes a roller 221 and a shaft 222. The shaft 222 has a positioning structure 222p, the shaft 222 passes through and is connected to the roller 221. The positioning structure 222p is pivotally disposed on the limiting space 211s of the limiting element 211. The roller module 220 is received in the limiting space 211s and is allowed to rotate along an axial direction of the shaft 222 in the limiting space 221s or to reciprocate in a direction (such as the Z direction shown in the figures) perpendicular to the surface of the base 210. In an embodiment, the positioning structure 222p is a dumbbell-shaped structure with two radial protruding portions 222p1 and one middle recessed portion 222p2. The limiting element 211 is pivotally connected to the middle recessed portion 222p2 and limited by the two protruding portions 222p1, such that the roller module 220 may be positioned relative to the base 210 along a radial direction (such as the X direction shown in the figures).

Refer to FIG. 2A and FIG. 2D, the encoding element 230, which may be a rotary encoder, is disposed on the circuit module 260 and connected to the roller module 220. The shaft 222 is connected to the encoding element 230, and the shaft 222 has a rotor 231 driven by the roller module 220. Similar to the design of FIG. 1D and FIG. 1E of the first embodiment, the end portion 222e of the shaft 222 adjacent to the encoding element 230 may be designed as a hexagonal shaft, and the center hole 230h of the rotor 231 of the encoding element 230 may be designed as a hexagonal hole, such that the shaft 222 is engaged with the encoding element 230 via the shaft-hole fit between the end portion 222e and the center hole 230h. However, the present invention is not limited thereto. In other embodiments, the shaft 222 and the center hole of the rotor 231 may have other shapes, and any shape would do as long as the encoding element 230 can be driven by the roller module 220. In embodiment, the roller module 220 and the encoding element 230 may be connected by using a transition fit.

Refer to FIG. 2A, the elastic element 240 may be a compression spring whose coefficient of elasticity (torsion) is designed to be in a range of 25 to 45 gram force (gf). Exemplarily but not restrictively, the elastic element 240 is formed of a metal spring. The elastic element 240 is disposed between the roller module 220 and the encoding element 230, and the elastic element 240 surrounds the shaft 222. The elastic element 240 is propped against the roller module 220 and the encoding element 230, respectively. Refer to FIG. 2D, the elastic element 240 has a first end portion 241 and a second end portion 242, wherein the first end portion 241 is propped against the shaft 222, and the second end portion 242 is propped against the encoding element 230. An original length of the elastic element 240 may be designed to be greater than a distance between the encoding element 230 and the roller module 220. The elastic element 240 is configured to provide an elastic force at the first end portion 241 and the second end portion 242 to position the roller module 200.

Refer to FIG. 2C and FIG. 2D, the first end portion 241 of the elastic element 240 is propped against the radial protruding portion 222p1 of the positioning structure 222p. The second end portion 242 is propped against the rotor 231 adjacent to the encoding element 230 of the roller module 220. The elastic element 240 applies a force to the roller module 220 along an axial direction of the shaft 222, such that the roller module 220 may be positioned relative to the base 210 along the axial direction (such as the X direction shown in the figures) of the shaft 222.

The operation principles of the elastic element 240 of the first embodiment are described below with FIG. 2A and FIG. 2D. When a user rotates the roller mechanism 200 along an axial direction (such as the X direction shown in the figures), the roller 221 is rotated by a moment. Due to the gap between the roller 221 and the limiting element 211, the roller module 220 may be shaked to the left and the right in the axial direction of the shaft 222. With the elastic element 240 is provided, the first end portion 241 can be propped against the radial protruding portion 222p1 and apply a force to the roller module 220 along the axial direction of the shaft 222, such that the roller 221 receives a spring pressure and is positioned along the axial direction. The roller 221 remains at a middle position during the operation, and thus noise will not be generated. In an embodiment, when a user operates the rolling mechanism 200, the operating load of the elastic element 240 is preferably in a range of 25 to 45 gram force (gf).

The switch element 250, which may be a micro switch, is configured for trigger of a roller of mouse. Refer to FIG. 2A, the switch element 250 is disposed on the circuit module 260, and the switch element 250 and the encoding element 230 are respectively located on two opposite sides of the roller module 220. When a user presses or releases the roller 221, the roller module 220 is allowed to vertically reciprocate (such as along the Z direction shown in the figures) to contact the switch element 250 and trigger corresponding functions to the roller 221. However, the present invention and is not limited thereto. The switch element 250 and the encoding element 230 may be located on the same side of the roller module 220 as long as the roller module 220 can contact the switch element 250 when reciprocating.

The circuit module 260, which may be a printed circuit board assembly (PCBA), includes a circuit module and an electronic element electrically connected therewith, wherein examples of the electrical element includes IC circuit, storage element, light-emitting element and antennal element used in the mouse. Refer to FIG. 2A, the circuit module 260 is disposed on the base 210 and has a recess 261, which allows the limiting element 211 to pass through. The circuit module 260 may be used to carry and be electrically connected with the encoding element 230 and the switch element 250.

To summarize, the rolling mechanism disclosed in the embodiments of the present invention comprises an elastic element disposed between a roller module and an encoding element. Due to the physical property of elastic recovery, the elastic element, which is propped against the roller module, can reduce the noises generated between the roller module and the encoding element during the operation of the rolling mechanism and keep the roller of the roller module at the middle position, such that user's experience can be optimized. In aspects of application, the rolling mechanism 100 or the rolling mechanism 200 of the present invention may be disposed in a mouse device including a mouse body. The rolling mechanism 100 or the rolling mechanism 200 may also be disposed in the mouse body and become a product as a roller mouse.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rolling mechanism comprising:
   a base;
   a circuit module disposed on the base;
   a roller module disposed on the circuit module and movable on the base, wherein the roller module comprises:
      a roller; and
      a shaft passing through and connected to the roller;
   an encoding element disposed on the circuit module and electrically connected with the circuit module, wherein the shaft of the roller module is directly connected to the encoding element;
   a limiting element disposed on the base, directly contacting the base and configured to support the roller module, wherein the limiting element is independent of the encoding element and spaced apart from the encoding element, and the limiting element has two protruding structures connected to the base, each protruding structure has a limiting space, the shaft is pivotally disposed on the limiting spaces; and
   an elastic element disposed between the roller module and the encoding element, wherein the elastic element is propped against the roller module.

2. The rolling mechanism according to claim 1, wherein the elastic element has a first end portion and a second end portion, the first end portion is propped against the shaft, the elastic element surrounds the shaft, and the second end portion is propped against the encoding element.

3. The rolling mechanism according to claim 1, wherein the elastic element has a first end portion, a middle portion and a second end portion, the first end portion is propped against the shaft.

4. The rolling mechanism according to claim 1, wherein the shaft has a positioning structure, the roller module is positioned relative to the base through the positioning structure.

5. The rolling mechanism according to claim 4, wherein the elastic element is propped against the positioning structure.

6. The rolling mechanism according to claim 4, wherein the elastic element has a first end portion and a second end portion, the first end portion is propped against the shaft, the elastic element surrounds the shaft, and the second end portion is propped against the encoding element.

7. The rolling mechanism according to claim 4, wherein the elastic element has a first end portion, a middle portion and a second end portion, the first end portion is propped against the shaft.

8. The rolling mechanism according to claim 7, wherein the rolling mechanism further comprises:
   a fixed element disposed on the base and connected to the middle portion.

9. The rolling mechanism according to claim 8, wherein the fixed element has a groove, the second end portion is propped against an inner side of the groove.

10. The rolling mechanism according to claim 8, wherein the shaft has a limiting structure, the first end portion is engaged with the limiting structure.

11. The rolling mechanism according to claim 10, wherein the limiting structure forms an annular space, the first end portion is received in the annular space.

12. The rolling mechanism according to claim 10, wherein the first end portion has an arced structure whose contour matches an outer surface of the shaft.

13. The rolling mechanism according to claim 12, wherein the arced structure has a width in a radial direction of the roller, and the width is greater than a diameter of the shaft.

14. The rolling mechanism according to claim 12, wherein the fixed element further comprises a limiting part disposed adjacent to the lateral side of the first end portion, the limiting part is configured to limit a range of travel of the first end portion.

15. A mouse device comprising:
   a mouse body; and
   a rolling mechanism according to claim 1, wherein the rolling mechanism is disposed in the mouse body.

\* \* \* \* \*